United States Patent [19]

Ledford

[11] Patent Number: 4,580,999
[45] Date of Patent: Apr. 8, 1986

[54] METAL CHAIN-BELT

[75] Inventor: Roeby W. Ledford, Ithaca, N.Y.

[73] Assignee: Borg-Warner Corporation, Chicago, Ill.

[21] Appl. No.: 676,145

[22] Filed: Nov. 29, 1984

[51] Int. Cl.⁴ .............................................. F16G 1/22
[52] U.S. Cl. .................................. 474/201; 474/245; 474/215
[58] Field of Search ............... 474/201, 244, 245, 242, 474/240, 215; 24/700, 703

[56] References Cited

U.S. PATENT DOCUMENTS

| | | | |
|---|---|---|---|
| 406,112 | 1/1910 | Fouillaron | 474/201 |
| 1,488,710 | 4/1924 | Ramsey | 474/215 |
| 2,755,677 | 7/1956 | Bremer | 474/215 |
| 3,004,370 | 10/1961 | Tinnerman | 403/397 X |
| 4,313,730 | 2/1982 | Cole, Jr. et al. | 474/245 X |
| 4,512,754 | 4/1985 | Cole, Jr. et al. | 474/201 X |

FOREIGN PATENT DOCUMENTS

| | | | |
|---|---|---|---|
| 447981 | 7/1927 | Fed. Rep. of Germany | 403/240 |
| 430774 | 2/1948 | Italy | 403/395 |

Primary Examiner—James A. Leppink
Assistant Examiner—Thuy M. Bui
Attorney, Agent, or Firm—James A. Geppert

[57] ABSTRACT

A chain-belt for drivingly connecting the pulleys of a pulley transmission and constructed of interconnected sets of links which are interleaved with one another with pivot means connecting the sets of links and a load block encircling each set of links with a clip member for retaining the chain parts assembled. The clip is so shaped and orientated to substantially eliminate tilting of each load block with respect to the chain as the belt enters a pulley.

7 Claims, 5 Drawing Figures

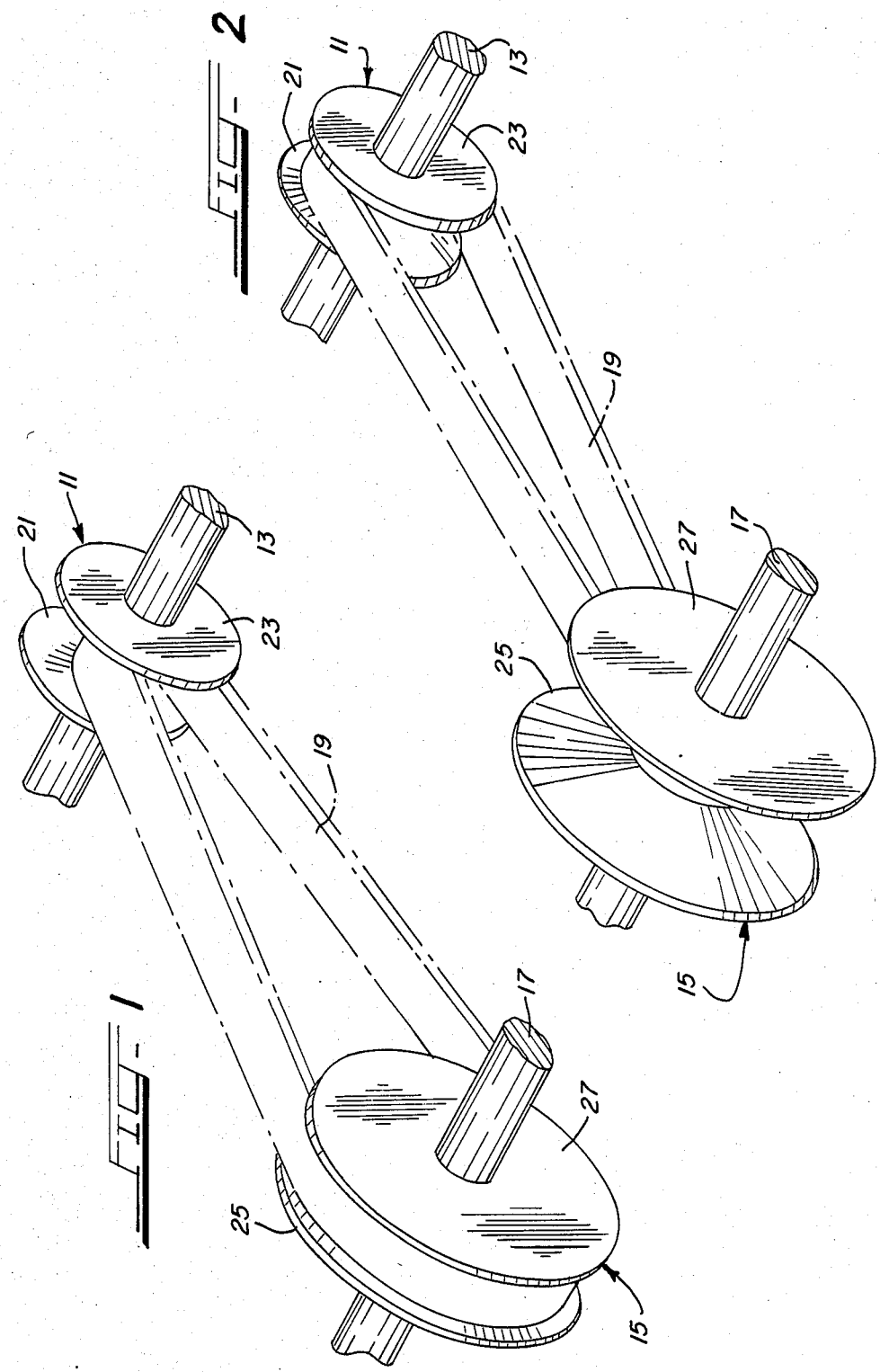

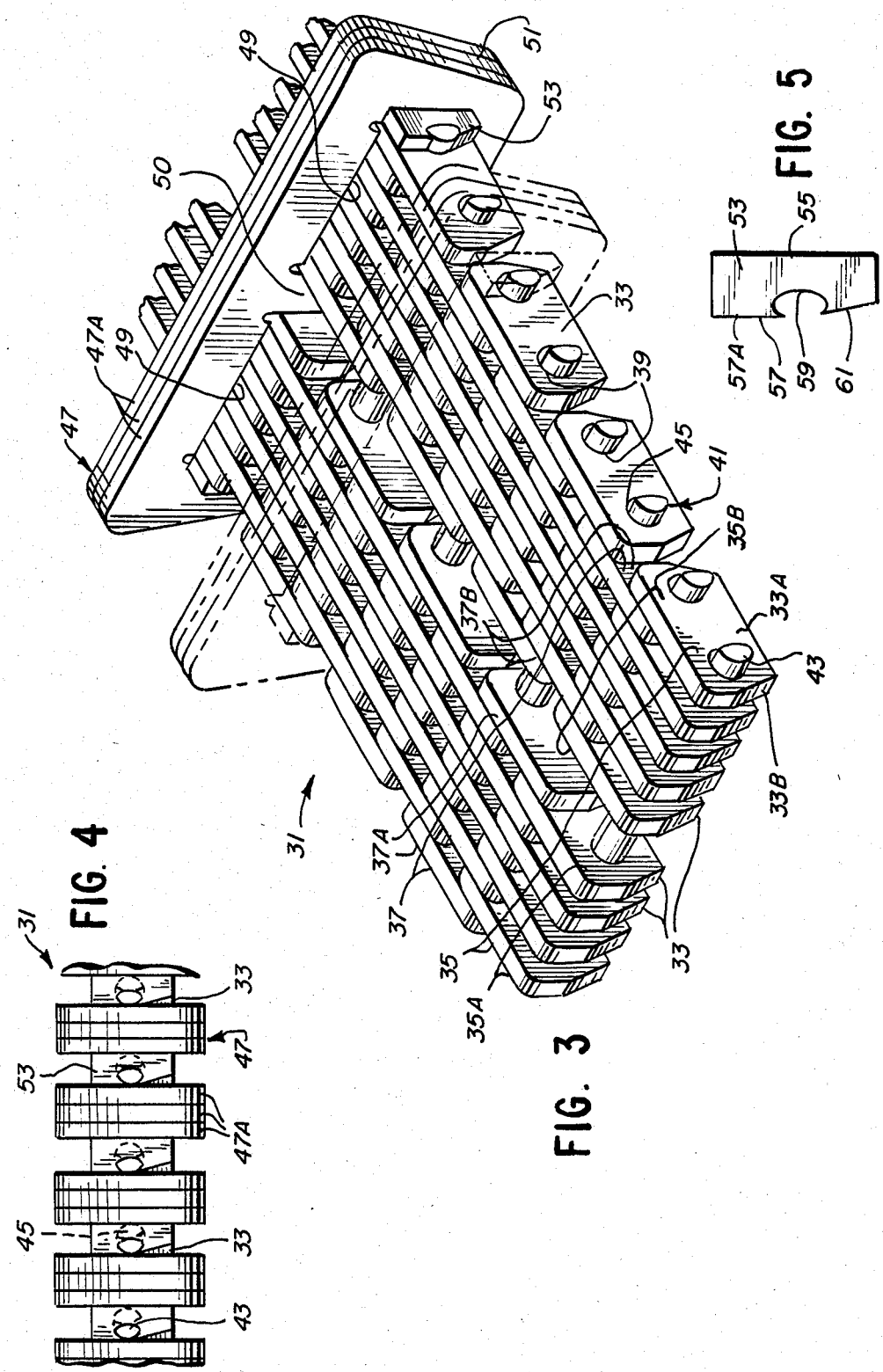

METAL CHAIN-BELT

BACKGROUND OF THE INVENTION

Variable pulley transmissions for transferring torque from an input shaft to an output shaft have been used for some time. The variable pulley transmission usually comprises a first pulley mounted on the input shaft, the pulley having at least one flange axially movable relative to its other flange to change the effective pulley diameter. A second, similarly adjustable pulley is mounted on the output shaft, and the pulleys are intercoupled by a flexible belt to transfer torque therebetween. As the effective diameter of one pulley is changed, and simultaneously the effective diameter of the other pulley is changed in the opposite direction, the drive ratio between the input and output shafts is adjusted in a smooth, continuous manner.

For several decades automotive engineers have recognized that the maximum operating efficiency of the engine could be achieved if the transmission could be controlled by adjusting to different loads and speed ratios such that the engine is maintained at its maximum efficiency point. This is not possible with a conventional geared transmission in which the drive ratio is adjusted in discrete steps, rather than continuously. Accordingly, efforts have been directed to the use of a continuously variable transmission of the type described above. This has resulted in the production and marketing in Europe of the Daf passenger car, using a flexible rubber belt in such a continuously variable transmission (CVT). Flexible rubber belts in such use are subject to wear by reason of the torque they must handle, and operate under severe temperature, vibration and other adverse conditions. To improve belt life, efforts have been made to produce a flexible metal belt, and some of these efforts are described in the patent literature.

One type of metal belt which has been described is composed of a central carrier or indexing strand composed of a plurality of nested, endless, metal bands on which are threaded a plurality of generally trapezoidal or V-shaped (when viewed from the front) metal load or drive blocks, the blocks being longitudinally slidable along the carrier or indexing strand during operation. Because the individual blocks are in compression as they transfer torque between the pulleys, this type of flexible belt is frequently termed a "push" belt. It is relatively expensive to manufacture because the endless metal bands must be matched for their nested assembly, the load blocks must be stamped and finished, then the blocks must be assembled onto the strand of nested bands. As example of this type of push belt is described in U.S. Pat. No. 3,720,113.

Another type of flexible metal belt uses an endless chain as the carrier or indexing strand in lieu of the more expensive nested endless band array. A belt in which the carrier or indexing strand is a chain is generally termed a "chain-belt." The chain links sets are connected by cylindrical pins, or other suitable pivot means. The drive or load blocks are generally trapezoidal or V-shaped and are positioned between a pair of consecutive pivot members. The drive or load blocks in a chain-belt have little, if any, longitudinal movement with respect to the chain and the pivot members. This type of chain-belt is termed a "pull" belt, and is much less expensive to manufacture than the "push" belt described before because the chain links and load blocks are stamped from sheet metal and the parts are assembled by automatic machinery. There is no need to match the band lengths required for nesting the enless bands for the push type belt. Also installation and replacement of a pull belt is much simpler than the push type belt. An example of a pull type chain-belt is described in U.S. Pat. No. 4,313,730. The push belt is a continuous loop and requires disassembly and re-assembly of the pulleys when installing or replacing a belt; the pull belt can be manufactured in a finite length, wrapped around the pulleys and the ends connected to form the continuous loop.

As shown in the latter patent, each load block of an assembly defines a central window through which links pass, i.e., the load blocks surround the sets of links. As the torque requirements are increased, wider chain is required, which also requires wider load blocks. Because of the loading of the block, various stresses are introduced into the blocks, at times leading to their failure. Thus it has been suggested to provide multiple window blocks with a sub-set of links passing therethrough, the sub-sets being joined by a common pivot means.

In the development of the chain-belt, various types of pivot or joint means, i.e., those parts which pivotably interconnect sets of links, have been suggested. These include round pins and rocker joints, the latter comprising what is termed a pin and a rocker. In some cases, a pin and a rocker differ in cross-section and in other cases they have the same cross-section. Usually, one of the two is of a different length than the other and the longer part extends exteriorly of the side links of a chain. To retain the links in the assembly it has been customary to peen over the ends of the part. The use of a generally C-shaped clip to retain the chain parts in the assembly has been suggested. One form of such a clip spans the chain from side to side with clip ends engaging the ends of the pivot means. Another form of a C-shaped clip is one which is received in a groove in the pivot member abutting a side link of the chain. For this type, two such clips are required for each joint member. Such a clip is illustrated in U.S. Pat. No. 1,488,710 issued Apr. 1, 1924. The latter is described with reference to a chain and not a chain-belt, i.e., an assembly of a chain and load blocks, as will be described herein.

Theoretically, in a chain-belt, when the belt enters a pulley, the blocks are aligned radially. However, in actual practice, the load blocks have a tendency to tilt with respect to the carrier, i.e., the chain and the edges of the windows "dig" into and damage the chain links. For some unexplained reason, damage to the links' lower surfaces is more severe than damage to the links' upper surfaces. Nevertheless, severe damage to the links can cause premature failure of the belt. The amount of damage of this nature can be materially reduced by the invention herein to be described.

SUMMARY OF THE INVENTION

According to the invention to be described herein, an improved chain-belt is provided in which a new and novel clip is used to retain the parts of the chain in assembled relationship. The clip permits articulation of the assembly about its pivot points, so that it can engage the pulleys of a pulley transmission. The use of the novel clip substantially eliminates tilting of the load blocks as they enter a pulley and thus materially reduces and sometimes substantially eliminates damage to the chain's links by the blocks 'digging' into their surfaces.

The clips of this invention thus permit articulation of the chain-belt and provide orientation of the load blocks.

The new and novel clip for the chain-belt of this invention comprises a metal member having a first straight edge and an opposed edge shaped to frictionally engage a pivot member and also with a lower portion angled toward the straight edge. The clip is positioned on the pivot member so that the straight edge leads the opposed edge as the chain belt enters a pulley. The straight edge abuts a load block and prevents the backward tilting of the block while the angled portion of the opposed edge permits articulation of the chain. In other respects the improved chain-belt is or can be similar to that illustrated in U.S. Pat. No. 4,313,730, previously referred to. The chain-belt is constructed of sets of interleaved links joined by pivot means.

BRIEF DESCRIPTION OF THE DRAWINGS

FIGS. 1 and 2 are schematic illustrations of a pulley transmission in which the pulleys are interconnected by a belt showing the pulleys in a first drive ratio (FIG. 1) and in a second drive ratio (FIG. 2);

FIG. 3 is a perspective view of a portion of a chain-belt constructed in accordance with this invention;

FIG. 4 is a side view of the portion of a chain-belt illustrated in FIG. 3; and

FIG. 5 is an enlarged view of the clip of this invention.

DETAILED DESCRIPTION OF THE PREFERRED EMBODIMENT

FIGS. 1 and 2 of the drawings illustrate schematically a continuously variable transmission (CVT) in two drive ratios. A first pulley 11 is connected to a shaft 13 and a second pulley 15 is connected to a shaft 17. One shaft is a drive shaft and the other shaft is a driven shaft. A continuous, flexible belt 19 interconnects the pulleys 11 and 15 to transfer torque therebetween. Pulley 11 comprises flanges 21 and 23 while pulley 15 comprises flanges 25 and 27. In order to change the drive ratio between the pulleys and the shafts, flange 21 of pulley 11 is made axially movable with respect to flange 23, and correspondingly, flange 27 of pulley 15 is axially movable with respect to flange 25. It is understood that both flanges of a pulley may be axially movable with respect to each other, but generally this is not necessary to effect the changes in the drive ratios between the pulleys and their respective shafts. Various types of controls may be used to effect the changes in drive ratio but these are not within the purview of this invention and need no further reference. As can be readily understood, the side surfaces or edges of the continuous, flexible belt 19 frictionally engage the pulley flanges when transmitting torque from the drive pulley to the driven pulley.

As mentioned previously, one type of drive belt to interconnect the pulleys is referred to as a chain-belt. FIGS. 3 and 4 illustrate various features of a chain-belt 31 (only a portion or segment of a complete, endless belt being shown) constructed according to this invention. The chain-belt 31 comprises links 33 arranged in sets 35 and 37 which are interleaved or "laced" with one another. A "set" of links is those links which are grouped transversely together; at times a set of links is referred to as a "rank." Each link 33 is provided with a pair of space apertures 39, each aperture being adjacent to an end of the link, and the apertures in a set are aligned with one another. When interleaved or laced with other sets of links, the apertures at one end are transversely aligned with those in the interleaved set, so that a pivot or joint means 41 illustrated comprises a first pin 43 and a second pin 45, each having a substantially identical cross-section. In the chain-belt of this invention, the first pins 43 extend beyond the surface 33A of the outermost links 33B while the second pins 45 terminate at the outermost surfaces 33A of the outermost links 33B. The width of the chain-belt is defined by the outermost surfaces 33A of the links 33B. The pivot means permit one set of links to articulate with respect to its interleaved sets, and thus the chain-belt can connect the pulleys, and the chain-belt can "wrap" at least partially around each pulley in the system. Other types of pivot joints can be used without departing from the invention.

To frictionally engage the pulley flanges, a plurality of load drive blocks 47 are used. Generally a load block (a solid member or one made as a laminate of several, thinner plates or members 47A to facilitate manufacture and reduce costs) is positioned to encircle a set of links between pivot means, and each block defines one or more central windows 49 permitting this construction. In the multiple window block construction, the windows 49 are separated by a strut 50 and the carrier is constructed with sub-sets 35A, 35B and 37A, 37B, and the sub-sets are joined by a common pivot member. Each load block has a pair of side or edge surfaces 51 for engaging the pulley flanges. Blocks are generally trapezoidal in shape when viewed from the front and at times are referred to as V-shaped.

As previously mentioned, the load blocks tilt to some degree with respect to the chain when entering the pulleys and bite into and damage the top and bottom surfaces of the links with which they are associated, an undesirable result. To substantially eliminate the tilting of the load blocks when they enter a pulley, and thus substantially eliminate the undesirable results of such tilting, and also to retain the chain parts in their assembled relationship, a clip 53 is used on both sides of the chain. The clip 53 is shown in an enlarged scale in FIG. 5, as well as being illustrated in the chain-belt assembly illustrated in FIGS. 3 and 4. The clip 53, as will be apparent from the foregoing description, firmly anchors pins 43 in position and also acts as a retainer for pins 45, so that they remain in their proper, operative positions. Clip 53 is a metal member having a first straight and leading edge 55 and a second and trailing edge 57. The second edge 57 has a straight upper portion 57A, a recess 59 which conforms in shape to a major portion of the pin 43 and is adapted to snap thereon. The body of the clips covers the ends of the pins 45. Thus, the parts are retained in assembled relationship. The edge 57 also has a portion 61 which tapers toward the edge 55. Edge 55 is such to engage a surface of the adjacent load block and is leading edge of the clip when the chain-belt enters a pulley. Portion 57A of edge 57 abuts the other of the adjacent load blocks but the tapered portion 61 permits the articulation of the joint in one direction while the upper portion 57A prevents backward articulation of the assembly.

In testing such a chain-belt constructed according to this invention, it was found that the "notching" of the chain's links during pulley entrance was materially reduced. Visual observation of before (links joined in a normal manner) and after (using the clip as described) the damage to (or notching of) the links was reduced by about 90%.

The invention has been thus described and illustrated with respect to a chain-belt having load blocks, each with multiple window. The invention is also applicable to those chain-belts in which the load blocks have single windows.

The clip of this invention can also be used with other types of joints interconnecting the links of chain-belts, as known in the art, without departing from the spirit thereof.

While the invention has been described with reference to a preferred embodiment, it is to be understood that the claims are intended to cover reasonable equivalents of the claimed and described structure.

I claim:

1. An endless power transmission chain-belt especially adapted to interconnect the pulleys of a pulley transmission comprising:

a plurality of sets of interleaved links;

pivot members joining said sets of links permitting articulation thereof;

loads blocks having side edges to engage said pulleys and each encircling a set of links; and a plurality of retainer means for maintaining said links in assembled relationship, each retainer means having a portion engaging a pivot member and having a front, leading surface and an opposed, trailing surface, said front leading surface abutting a load block and preventing said load block from tilting with respect to said links, and said trailing surface having a tapered portion to permit said articulation of said links in one direction and a straight portion to prevent articulation of said chain-belt in a direction different from said one direction.

2. An endless power transmission chain belt as recited in claim 1 in which said trailing surface has a recess at the intersection of said straight portion and tapered portion frictionally receiving a pivot member.

3. A clip for retaining a chain constructed of links joined by pivot means in assembled relationship while permitting articulation thereof about each pivot means, said clip frictionally engaging a pivot means of said chain and comprising a member having a first, straight edge and an opposed edge, said opposed edge having a portion tapered toward said first edge and a portion to frictionally engage said pivot means.

4. An endless power transmission chain-belt especially adapted to interconnect the pulleys of a pulley transmission comprising:

a plurality of sets of links;

pivot means interconnecting the sets of links with adjacent sets being interleaved with one another, the alternating sets of links having outermost links each of which has an outermost surface to thus define the width of said chain belt;

said pivot means comprising a first and a second pin having substantially identical cross-sections, the first pin having a length greater than the width of said chain-belt so that it extends beyond the outermost surfaces thereof and the second pin having a length substantially the same as the width of said chain-belt;

a plurality of load blocks, each surrounding a set of links and each load block being generally trapezoidal when viewed from the front with side edges adapted to engage the pulleys of the pulley transmission; and substantially flat clip means each frictionally engaging said first pin and having a body portion abutting the outermost surface of a set of alternative links to retain the pivot means in position, and clip means also having a first edge substantially abutting a surface of a load block and a second edge having a first portion substantially abutting a next succeeding load block and a second portion tapered to permit articulation of said chain-belt in one direction.

5. A chain-belt as recited in claim 4, in which said chain-belt is orientated so that said first edge of said clip preceeds said second edge when said blocks engage said pulleys.

6. A chain-belt as recited in claim 4, in which said body portion of each clip covers the end of a second pin to retain the second pin in position.

7. A chain-belt as recited in claim 4, including a recess in said second edge at the intersection of said first and second portions frictionally receiving an end of said first pin.

* * * * *